(12) United States Patent
Lizalde et al.

(10) Patent No.: US 10,273,171 B2
(45) Date of Patent: Apr. 30, 2019

(54) DEVICE FOR IMPROVING THE CHEMICAL AND PHYSICAL PROPERTIES OF WATER AND METHODS OF USING SAME

(71) Applicant: Wellspring Water Technologies, LLC, Escondido, CA (US)

(72) Inventors: William Lizalde, Oceanside, CA (US); John Beck, Escondido, CA (US)

(73) Assignee: Wellspring Water Technologies, LLC, Escondido, CA (US)

( * ) Notice: Subject to any disclaimer, the term of this patent is extended or adjusted under 35 U.S.C. 154(b) by 576 days.

(21) Appl. No.: 14/926,620

(22) Filed: Oct. 29, 2015

(65) Prior Publication Data

US 2016/0137531 A1  May 19, 2016

Related U.S. Application Data

(60) Provisional application No. 62/075,474, filed on Nov. 5, 2014.

(51) Int. Cl.
  *C02F 1/00* (2006.01)
  *C02F 1/48* (2006.01)
  *C02F 9/00* (2006.01)

(52) U.S. Cl.
  CPC .............. *C02F 1/481* (2013.01); *C02F 1/003* (2013.01); *C02F 1/005* (2013.01); *C02F 9/005* (2013.01); *C02F 2201/006* (2013.01); *C02F 2301/026* (2013.01)

(58) Field of Classification Search
  CPC .......... C02F 1/481; C02F 1/003; C02F 9/005; C02F 1/005; C02F 2201/006; C02F 2301/026
  See application file for complete search history.

(56) References Cited

U.S. PATENT DOCUMENTS

| | | | |
|---|---|---|---|
| 5,024,759 A | 6/1991 | McGrath et al. | |
| 5,770,089 A | 6/1998 | Kubo | |
| 5,795,471 A * | 8/1998 | Naito | B01J 47/024 |
| | | | 210/223 |
| 6,016,977 A | 1/2000 | Farley | |
| 8,864,998 B1 | 10/2014 | Siamon | |
| 2008/0169232 A1 | 7/2008 | Lee | |
| 2009/0039006 A1 | 2/2009 | Chung | |
| 2010/0230359 A1 | 9/2010 | Whitehead et al. | |

FOREIGN PATENT DOCUMENTS

| | | | |
|---|---|---|---|
| CN | 101723536 | 6/2010 | |
| DE | 202012006599 | 8/2012 | |
| DE | 202012006599 U1 * | 8/2012 | ............ C02F 1/481 |
| WO | WO-2016073270 A1 * | 5/2016 | ............ C02F 1/481 |

OTHER PUBLICATIONS

Written Opinion for the International Searching Authority, dated Apr. 2016. (Year: 2016).*

* cited by examiner

*Primary Examiner* — David A Reifsnyder
(74) *Attorney, Agent, or Firm* — Lewis Kohn & Walker LLP; David M. Kohn; Kari Moyer-Henry

(57) ABSTRACT

A water treatment device for altering the chemical and physical properties of water for use in existing plumbing and/or piping systems wherein the treatment device may be customized for intended use and for treatment of the water profile in the geographical area of installation.

12 Claims, 6 Drawing Sheets

*Large Screen*

*Small Screen*

Completed Unit

DEVICE FOR IMPROVING THE CHEMICAL AND PHYSICAL PROPERTIES OF WATER AND METHODS OF USING SAME

RELATED APPLICATIONS

This application claims priority from U.S. Provisional Application No. 62/075,474, filed on Nov. 5, 2014, the contents of which are hereby incorporated by reference herein.

FIELD OF THE INVENTION

The present invention pertains generally to water treatment devices. More particularly, the present invention pertains to a water treatment device for 1) in-line installation within the plumbing of landscape and agricultural irrigation systems, residential, whole-house systems and pools, fountains and other decorative water feature systems and; 2) attachment to faucets and garden hoses for additional residential uses.

Municipal water systems adhere to minimum federal and state standards for allowed levels of chemical, mineral and biological contaminates. But only a small fraction of potentially harmful contaminants are subject to these standards. In addition, these systems often add chemicals to water like chlorine and fluoride to help meet federal and state standards. These processes, as well as the high-pressure distribution systems used to deliver the water, have the effect of creating an "artificial" state not found in the best, natural water sources.

Depending on its source, typical tap water may contain harmful organic or inorganic contaminant minerals such as lead, copper, and strontium and microbiological contaminants such as coliform bacteria. In addition, tap water may have inadequate levels of beneficial minerals such as calcium and magnesium which are essential for cardiovascular health as well as strong teeth and bones.

In many parts of the world, the only available sources of water for drinking, irrigation, recreational and other residential uses contain high levels of"salts". High salt levels in the water can be damaging to some types of plants requiring significantly higher levels of irrigation and leading to poor soil conditions, unhealthy plants and reduced agricultural yields. Hard water also results in the deposition of layers of calcium carbonate crystal or "scale" on the surfaces of pools and water features and in the various surfaces (metal, plastic, etc.) of the equipment involved in providing water to pools and water features. This scale buildup can lead to the premature deterioration of these systems and inefficiencies in their operation. This scale can also build up on other residential water using devices and surfaces such as showers, sinks and appliances and even on the surfaces of products cleaned using this water such as glassware and automobile finishes.

Reverse osmosis (RO) water purification systems are used widely to provide additional treatment of water from municipal or other sources for residential and agricultural use. Often, bottled water, used exclusively by many for drinking, is also treated using RO. Unfortunately, RO is a very energy intense, wasteful and damaging process striping the water of all minerals (including beneficial minerals) and antioxidants, changing the molecular structure and PH balance of water and producing harmful byproducts.

Our bodies function best when they are neither too acidic nor too alkaline. Unfortunately almost all of us have become acidic due to poor diets, lack of regular exercise and stress. The degree of acidity or alkalinity is measured in terms of a value known as pH which ranges from 0 on the acidic side to 14 on the alkaline. Normal blood pH ranges from 7.35-7.45. To counteract the acidic effect of diet, lack of exercise and stress, it is widely held that the most beneficial drinking water should be slightly alkaline, above 7.5. Agricultural applications may require a different PH target based on the crops involved.

Generally speaking, achieving the proper mineral balance, eliminating harmful contaminants and improving soil quality are helpful in growing healthy fruits and vegetables. In addition, by breaking up large clusters of dissolved solids and dissolving salts, better soil permeability is achieved. This allows water to penetrate through layers of calcium carbonate "crust" and reach deeper into the soil to provide more effective delivery of water and essential nutrients. The resultant plants are lush and more productive while using less water.

In light of the above, it is an object of the present invention to provide the desired features described herein as well as additional advantages of providing a water treatment device that uses no chemicals or energy, produces no waste, requires very little ongoing maintenance and is customizable to treat the specific qualities of the water profile in the area of installation.

SUMMARY OF THE INVENTION

The present invention is a device directed to: 1) in-line installation within the plumbing of landscape and agricultural irrigation systems, residential, whole-house systems and pools, fountains and other decorative water feature systems and; 2) attachment to faucets and garden hoses for additional residential uses.

It is an object of the present invention to treat water originating from natural sources such as wells, streams and rivers as well as municipal water prior to end use.

It is another object of the present invention to provide a water treatment device that is customized for treatment of the water profile in the geographical area of installation.

It is still another object of the present invention to provide a water treatment device which alters the characteristics of water passing through the system by altering both the physical and chemical properties of the treated water.

It is yet another object of the present invention to provide a water treatment device which utilizes at least four treatment modalities: 1) rare-earth magnets configured in a unique arrangement; 2) active-ceramic beads; 3) vortex generators and; 4) design features which create a low pressure/flow rate and high water-volume environment, in a single system It is still another object of the present invention is to provide a water treatment device which can be custom configured to achieve desirable pH ranges.

Another object of the present invention is to provide a water treatment device that when used with appropriate filtration technology, is designed to remove harmful contaminants and enhance beneficial minerals.

It is another object of the present invention to provide a water treatment device that improves the ability of plants to uptake water resulting in reduced use of water in irrigation and agricultural applications.

In still another object of the present invention is to provide a water treatment device that improves the ability of plants to uptake beneficial nutrients resulting in reduced use of fertilizer in irrigation and agricultural applications.

It is yet another object of the present invention is to provide a water treatment device that dissolves and flushes away harmful salts resulting in improved agricultural production.

Another object of the present invention is to provide a water treatment device that improves the permeability of water through soil, membranes and biological systems.

Another object of the present invention is to provide a water treatment device that demonstrates its greatest affect on the poorest quality soil and water In still another object of the present invention is to provide a water treatment device that reduces the rate of hard water scale formation in systems handling water with high calcium carbonate concentrations.

Another object of the present invention is to provide a water treatment device that dissolves previously deposited hard water scale formations in systems handling water with high calcium carbonate concentrations.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

Figure 1:
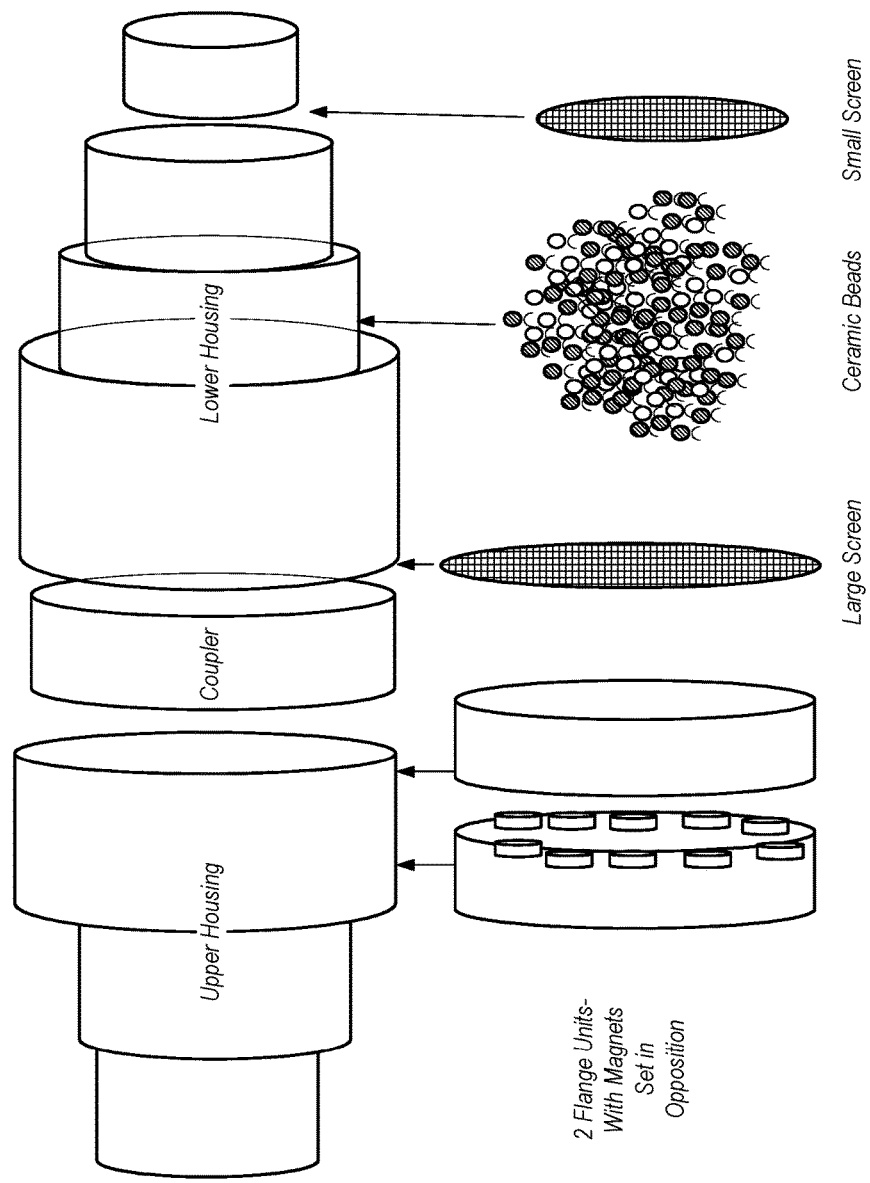
FIG. 1 illustrates a schematic diagram of the present invention.

With reference to FIG. 1, shown is a schematic diagram of the water treatment system of the present invention. The water treatment system consists of a housing made from a durable plastic material wherein the housing is further comprised of an upper housing and a lower housing connected by a coupler. The PVC housing encloses various chambers containing elements of the water treatment system. The upper housing encloses at least a first flange unit and a second flange unit, each flange unit further comprised of a plurality of chambers, the chambers configured to receive "donut style" rare-earth magnets in a precise design. After receiving the rare-earth magnets the flanges are installed in the unit with their magnetic fields in opposition approximately 1 inch apart. The magnet placement within the first flange may be the same or different as the magnet placement within the second flange. The lower housing encloses at least a first screen and a second screen, wherein the first screen may be larger in diameter than the second screen, the larger screen fitting in the upper housing adjacent to the coupler between the upper housing and the lower housing whereas the lower screen fits the lower housing at the end opposite the larger screen. The lower housing is further comprised of a central chamber which contains a active-ceramic bead mixture. For alternative embodiments, the housing may be made from any durable material suitable for the intended use and system for incorporation.

Figure 2:
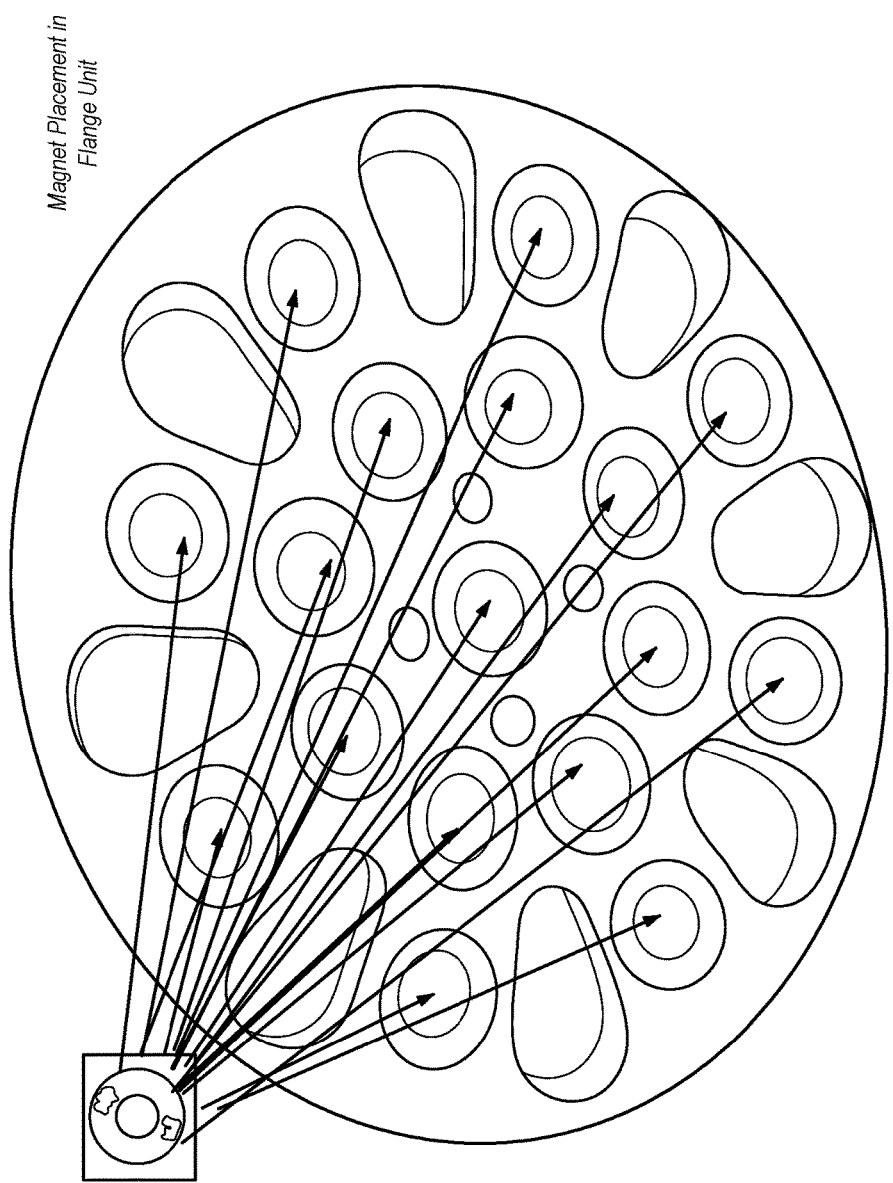
FIG. 2 illustrates a flange unit as utilized by the present invention.
Figure 3:
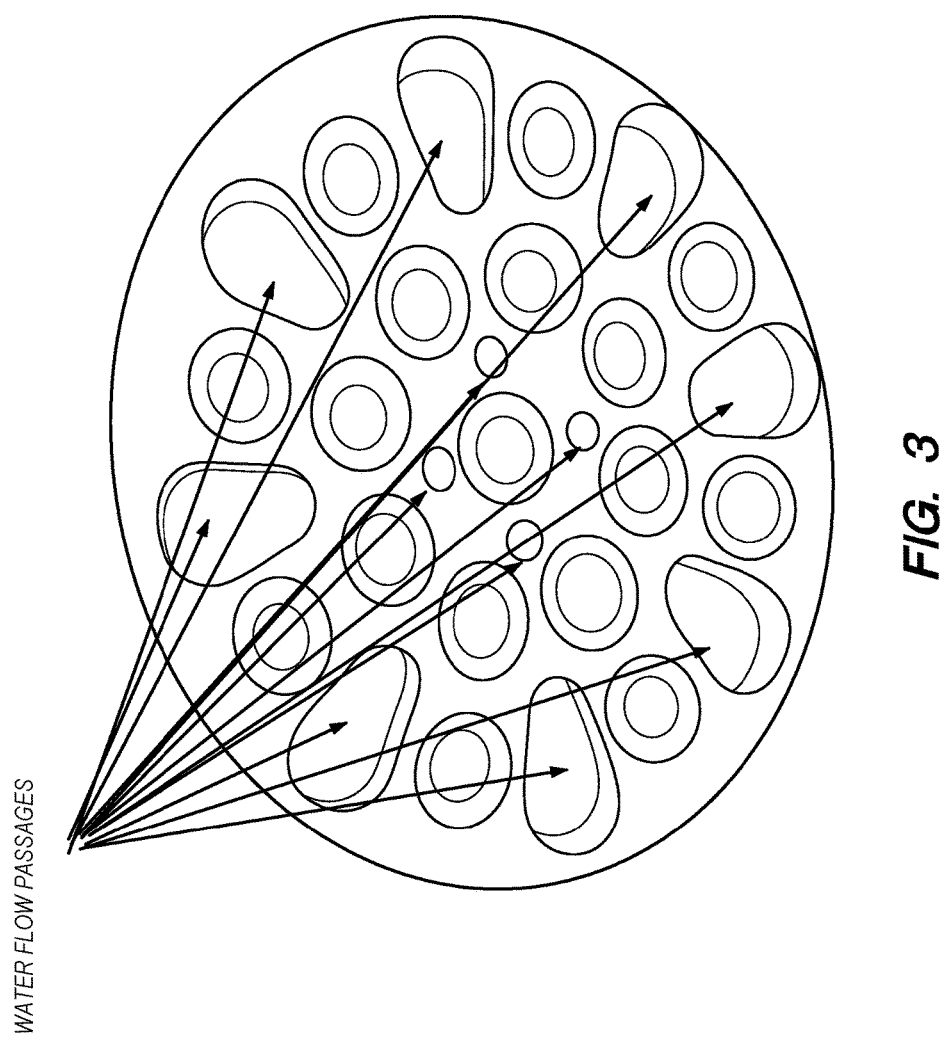
FIG. 3 illustrates an alternative view of the flange unit from FIG. 2.

With reference to FIG. 2, shown is the magnet placement within the at least first flange unit wherein the flange also includes baffles not having magnets. In a preferred embodiment, a plurality chambers and/or baffles in the flange contain a magnet. In a more preferred embodiment, the number of magnets may be selected from the group ranging from at least 9 to 25 magnets. With reference to FIG. 3, shown is the water flow passages in the flange unit of FIG. 2. In a preferred embodiment all water passes through the holes in the center of each "donut style" magnet. The precise arrangement of rare-earth magnets in the at least one flange unit and the space created between the two opposing flange units creates water movement and magnetic vortexes which beneficial alter the physical properties of water such as permeability and surface tension. Continued passage of water through the active-ceramic beads further beneficially modifies the chemical, pH, and electromagnetic properties of the water as it passes through the system. The system combines multiple modalities of water treatment (active ceramic beads, vortex generators and rare-earth magnets) within a single unit in a high-volume, low pressure/flow rate environment thereby maximizing the treatment results such that water does not return to its untreated state upon exiting the system.

Figure 4:
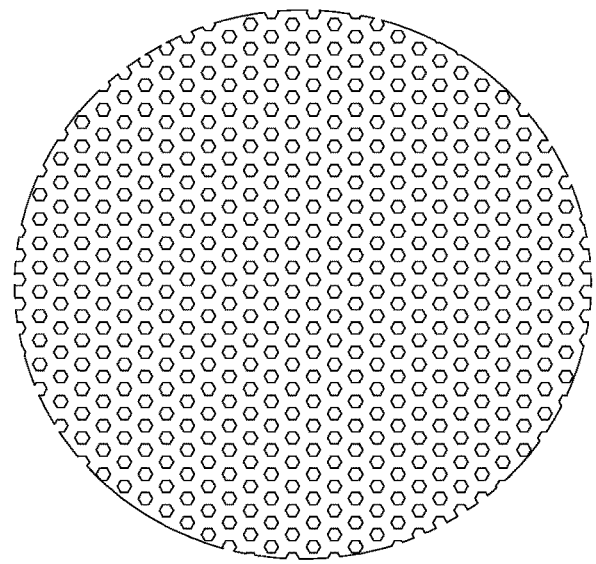
FIG. 4 illustrates a large screen as utilized by the present invention.
Figure 5:
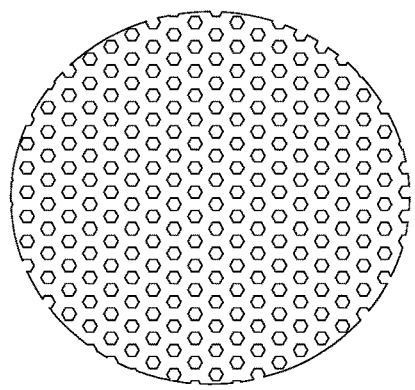
FIG. 5 illustrates a small screen as utilized by the present invention.

With reference to FIG. 4, shown is the larger screen component which fits within the lower housing of the present invention. With reference to FIG. 5, shown is the smaller screen component which fits within the end of the lower housing of the present invention opposite the larger screen.

Figure 6:
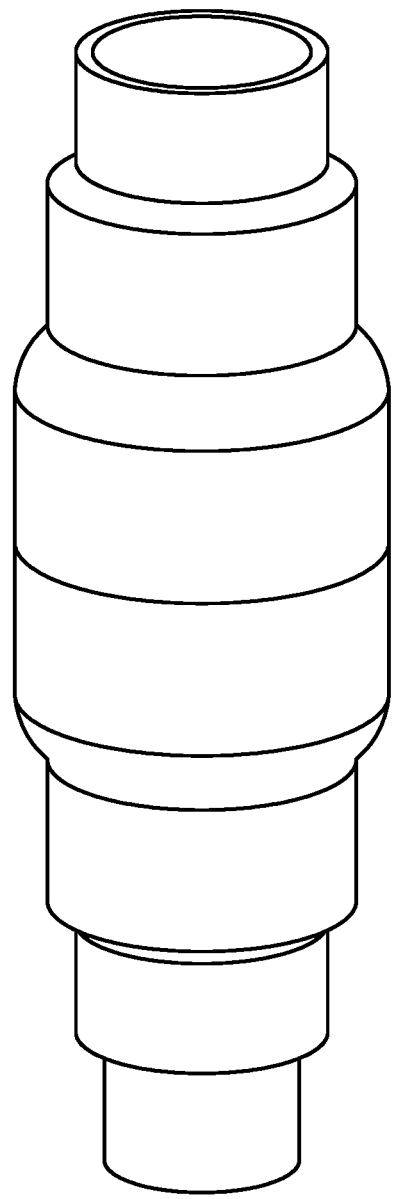
FIG. 6 illustrates an assembled embodiment of the present invention.

With reference to FIG. 6, shown is an exemplary assembled water treatment system prior to installation in-line with existing plumbing of residential, recreational or agricultural water supply systems. Water moves through the assembled water treatment system unidirectionally, first entering the system through the upper housing, passing through the at least two flange units, next passing through the coupler and into the lower housing through the larger screen, and finally passing through the ceramic bead mixture and exiting the system through the smaller screen in the lower housing. Water moves through the treatment system in high volumes at low pressure as opposed to the majority of water treatment systems which force water through the system at low volumes under high pressure. Additional embodiments may be modified to accommodate various water flow rates and/or various pressure levels as appropriate for the intended use. Further in contrast to other treatment systems, the water treatment of the present invention does not rely on external power or moving parts. In a preferred embodiment, a subassembly of the flange units (with magnets), the screens and the active-ceramic beads is created in a separate, removable "active cell" housing which itself fits into the housing. A proprietary tool is required to remove the active cell for maintenance or replacement.

The water treatment system is designed to scale up in size depending on the application. The basic configuration of magnets, active-ceramic beads, flanges and chambers remains essentially the same regardless of size. Units range in size as follows: 2 inch, 3 inch, 6 inch, 8 inch and 12 inch depending on the pipe size they are installed in and the application. The two-inch model includes faucet and hose attachment pieces.

EXAMPLES

Membrane Permeability Test

The membrane permeability test was conducted under laboratory conditions. Well water was passed through a reverse osmosis (RO) membrane (Toray TMG 20-400) before and after treatment at constant pressure and two different flow rates. Water had relatively high salt content (2 g/L) and was passed at 50 psi at room temperature. The amount of passed water was recorded at 5 min. increment for 1 hour. Each experiment was repeated three times. All experimental data were normalized according to the standard procedure for RO membranes. The results show that treated water had higher permeability as seen in Table 1. Water permeability was presented as a ratio of a normalized amount of water (ml) passed through the membrane per one minute to applied pressure.

TABLE 1

| Water | Flow rate, ml/min | Pressure, psi | Permeability, ml/min × psi | Difference, % |
|---|---|---|---|---|
| Treated | 65 | 50 ± 5 | 4.706 ± 0.111 | 11.9 |
| Not-treated | | | 4.146 ± 0.172 | |
| Treated | 75 | | 5.148 ± 0.245 | 14.3 |
| Not-treated | | | 4.502 ± 0.402 | |

Water Chemistry

Initial water chemistry experiments were conducted in a closed loop system that included a pump, 10 gal tank, the treatment device (WWTS) and control valves (bypassing or passing through WWTS). Four different water sources (three from wells in and around San Diego, Ca, and a fourth from Escondido, Calif.'s municipal water source) were used. Salt content, measured by electrical conductivity (EC) ranged from 1.0 mS/cm to 5.4 mS/cm. Water was circulated for 30 min bypassing WWTS after which an initial sample was taken. Three samples were then taken after one, three and nine passes through the system including WWTS. Samples were analyzed in the laboratory one to two hours after the samples were taken.

TABLE 2

| Analyte, mg/L | Initial | Pass 1 | Pass 3 | Pass 9 |
|---|---|---|---|---|
| Well #1 May 15, 2015 | | | | |
| Cations: | | | | |
| Calcium | 708.9 | 677.2 | 675.1 | 667.8 |
| Magnesium | 103.2 | 99.0 | 98.5 | 98.7 |
| Potassium | 4.5 | 3.6 | 2.5 | 3.3 |
| Sodium | 350.7 | 338.7 | 337.7 | 334.1 |
| Anions: | | | | |
| Chloride | 1377.6 | 1312.2 | 1318.1 | 1318.1 |
| Nitrate as N | 12.2 | 11.8 | 12.0 | 11.8 |
| Sulfate Total | 573.9 | 553.3 | 558.0 | 557.2 |
| Alkalinity | 361 | 356 | 351 | 346 |
| Bicarbonate Total Alkalinity as CaCO$_3$ | 296 | 292 | 288 | 284 |
| pH | 7.05 | 7.10 | 7.10 | 7.12 |
| EC, mS/cm | 5.40 | 5.14 | 5.14 | 5.14 |
| Well #2 May 14, 2015 | | | | |
| Cations: | | | | |
| Calcium | 305.0 | 297.0 | 301.6 | 302.0 |
| Magnesium | 102.2 | 99.5 | 101.1 | 100.9 |
| Potassium | 7.2 | 6.7 | 6.7 | 6.9 |
| Sodium | 274.8 | 269.3 | 271.0 | 273.2 |
| Anions: | | | | |
| Chloride | 951.2 | 913.2 | 927.8 | 913.6 |
| Sulfate Total | 573.9 | 553.3 | 558.0 | 557.2 |
| Alkalinity | 195 | 195 | 193 | 195 |
| Bicarbonate Total Alkalinity as CaCO$_3$ | 160 | 160 | 158 | 160 |
| pH | 7.45 | 7.56 | 7.68 | 7.94 |
| EC, mS/cm | 3.49 | 3.42 | 3.43 | 3.42 |
| Well #3 May 18, 2015 | | | | |
| Cations: | | | | |
| Calcium | 173.7 | 171.1 | 168.3 | 168.3 |
| Magnesium | 71.8 | 70.8 | 68.9 | 69.3 |
| Potassium | 7.0 | 6.6 | 6.3 | 6.6 |
| Sodium | 150.8 | 148.8 | 148.2 | 148.7 |
| Anions: | | | | |
| Chloride | 286.3 | 282.8 | 279.8 | 275.4 |
| Nitrate as N | 5.3 | 4.8 | 5.0 | 4.7 |
| Sulfate Total | 369.9 | 370.5 | 367.5 | 362.1 |
| Alkalinity | 249 | 249 | 249 | 249 |
| Bicarbonate Total Alkalinity as CaCO$_3$ | 204 | 204 | 204 | 204 |
| pH | 7.51 | 7.52 | 7.54 | 7.56 |
| EC, mS/cm | 1.91 | 1.89 | 1.86 | 1.85 |
| Municipal Water May 18, 2015 | | | | |
| Cations: | | | | |
| Calcium | 76.8 | 76.2 | 77.2 | 78.3 |
| Magnesium | 25.1 | 24.7 | 25.5 | 25.7 |
| Potassium | 5.2 | 4.9 | 5.2 | 5.0 |
| Sodium | 105.8 | 104.3 | 106.5 | 106.7 |
| Anions: | | | | |
| Chloride | 97.6 | 98.5 | 99.5 | 100.3 |
| Sulfate Total | 226.1 | 226.5 | 226.6 | 226.7 |
| Alkalinity | 44 | 44 | 44 | 48 |
| Bicarbonate Total Alkalinity as CaCO$_3$ | 54 | 54 | 54 | 58 |
| pH | 7.99 | 8.01 | 8.01 | 8.02 |
| EC, mS/cm | 1.00 | 1.00 | 1.01 | 1.01 |

Subsequent water chemistry experiments were conducted with modified WWTS units that contained either only magnets, or only active-ceramic beads. Experiments were conducted with three different types of Biocera Ceramic Balls: CA, TO and SP in separate modified WWTS units. According to Biocera's website, their active-ceramic beads use different combinations of natural minerals to create products with varying properties, dependent on the application. In water treatment applications the active-ceramic beads assist in the removal of impurities from the water and supply a wide range of beneficial minerals and energy.

The experimental goal was to determine the chemical properties of water after bead treatment by measuring ionic concentrations (cations and anions) and pH.

Three (3.0) gallons of water were passed through beads at a flow rate of 150 ml/min. The volume of beads in the modified WWTS units was 53 $cm^3$ and retention time was 21.2 sec. Three types of water were investigated—distilled, municipal and well water. During the experiments water samples were taken to analyze anion/cation concentrations, pH, and EC. Experiments were immediately conducted in the laboratory due to concerns regarding the time gap between experiment and analysis. Treated water could quickly lose changed property characteristics if the analysis delayed.

Subsequent water chemistry experimental results from the modified WWTS unit containing only magnets showed no effect on either water chemistry or PH. Distilled water, as expected, had the lowest EC (2.5-3.0 uS/cm) and pH 5.5-6.5. Water chemistry results from the modified WWTS unit containing only CA active-ceramic beads (mainly composed of calcium and magnesium oxides) showed the most significant changes. EC significantly increased from 2.8 to 31.6 uS/cm and pH reached 9.5 as CA beads released calcium and bicarbonate which are typical alkalizing compounds.

TABLE 3

| Beads | pH | EC, uS/cm | Ca, mg/l | HCO3, mg/l | F, mg/l |
|---|---|---|---|---|---|
| Distilled Water | 6.0 | 2.8 | <0.1 | <1 | No |
| Water after CA beads | 9.5 | 31.6 | 6.2 | 9.8 | 0.87 |
| Water after TO beads | 5.3 | 2.7 | <0.1 | <1 | No |
| Water after SP beads | 5.1 | 2.6 | <0.1 | <1 | No |

| Beads | pH | EC, uS/cm | Ca, mg/l | Mg, mg/l | K, mg/l | Na, mg/l |
|---|---|---|---|---|---|---|
| Municipal Water | 8.0 | 977 | 69.8 | 23.3 | 4.1 | 96.9 |
| Water after CA beads | 8.3 | 968 | 75.1 | 24.0 | 5.0 | 100.6 |
| Water after TO beads | 7.9 | 969 | 70.2 | 22.8 | 4.3 | 95.4 |
| Water after SP beads | 7.9 | 972 | 70.1 | 23.0 | 4.3 | 96.1 |
| Well Water | 7.2 | 1920 | 171.2 | 70.4 | 8.5 | 147.3 |
| Water after CA beads | 7.6 | 1907 | 166.8 | 67.0 | 7.1 | 143.1 |
| Water after TO beads | 7.5 | 1909 | 167.4 | 68.6 | 6.0 | 144.5 |
| Water after SP beads | 7.5 | 1913 | 167.3 | 67.9 | 8.8 | 144.1 |

Fluoride level increases were also noted in treated water. TO and SP beads partly reduced pH but did not change cation/anion content (Table 3). The ceramic beads had less impact on municipal and well waters. Again, CA beads increased pH, but changes to salt concentrations decreased insignificantly compared to distilled water. TO and SP beads did not show any meaningful impact on the chemistry of water.

Experiments confirmed that the beads reduced the concentration of dissolved oxygen (Table 4). Importantly, the concentration of dissolved oxygen was unchanged in water treated with the modified WWTS unit containing only magnets suggesting this effect was due to the beads and that the action of the beads together with the magnets may have been synergistic.

TABLE 4

| | Dissolved Oxygen, mg/L | | | |
|---|---|---|---|---|
| Type of water | Before Treatment | After CA Beads | After TO Beads | After SP Beads |
| Distilled | 7.9 | 7.8 | 7.7 | 7.6 |
| Municipal | 8.4 | 7.8 | 7.7 | 7.7 |

Results showed that the active-ceramic beads did not impact water surface tension. However, water treated with WWTS demonstrated a significant change in surface tension. Before treatment, the surface tension of the sample water was 71.96±0.09 dynes/cm. After treatment, surface tension decreased to 69.56±0.07 dynes/cm. Thus, the complete WWTS unit changed the physicochemical properties of water. Therefore, the changes observed in chemical properties were the result of the ceramic beads while the physical properties changes were due to the magnets. Treatment reduced dissolved gases, increased pH, and decreased surface tension while reducing the salt content in water with high EC and increasing salt content of water having no chemical buffer (distilled water). Ultimately, the water became more stable after treatment.

We have demonstrated that a magnetic field has a significant effect on water properties. Passing water through WWTS subsequently favors the stabilization of water parameters. MT changed the physical parameters of water while ceramic beads altered its chemical parameters. Water with improved physical properties is beneficial for a variety of potential applications including irrigation, pools, heat exchangers, and spotless water or RO systems.

Column Experiment

Figure 7:
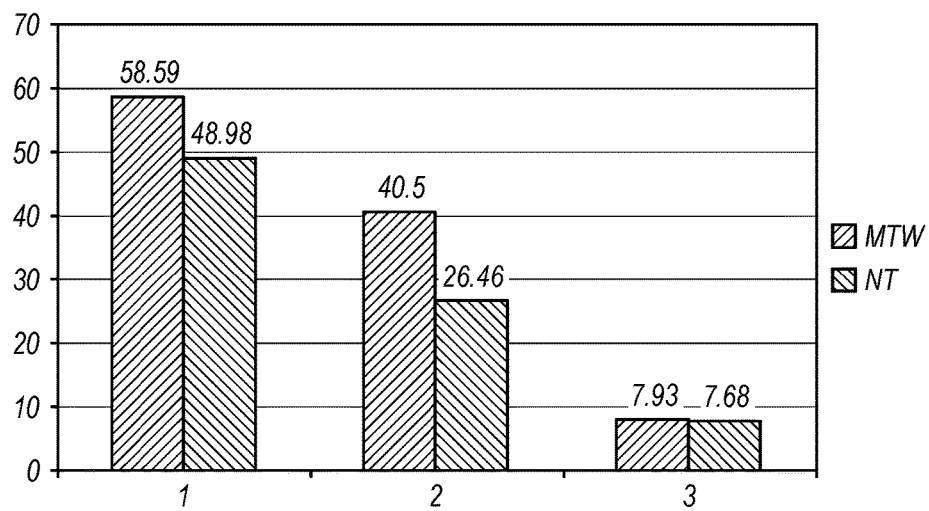
FIG. 7 illustrates a comparison of salts flushed from soil (g) by treated water and control water.

The first column experiment was conducted with sandy loam soil having a high concentration of sodium chloride. Columns were 6 inches diameter and 3 ft. long. A half-liter of water, either treated or raw well water (EC=2 mS/cm), was poured into the columns. Each column had a 1 gal reservoir to collect passed water. Soil properties were determined before and after the experiment which lasted one month. Water was collected and analyzed three times during the experiment as represented by columns 1, 2, and 3 of FIG. 7. Analysis results of salt collected are shown in grams for treated and untreated water conditions measuring 107.02 g and 83.12 g, respectively.

Although there was only a small difference in the passage of water through the columns for treated and untreated water (6.45 L and 6.36 L respectively), treated water had higher ability to dissolve and flush out salts.

The second column experiment was conducted using three types of soil to determine the effect of treated water on soil parameters. Soils are classified by the Natural Resource Conservation Service into four Hydrologic Soil Groups based on their respective runoff potentials. The four soil groups are designated A, B, C, and D; group A generally has the smallest runoff potential and group D has the greatest. The representative of group A used was "sandy loam". Sandy loam has low runoff potential and high infiltration rates even when thoroughly wetted. It consists of deep, well to excessively drained sands with a high rate of water transmission. Group B was represented by "silty loam."

Experiments were conducted over a period of one month. Soil was analyzed before and after the start of the experiment. Soil samples were taken from 1, 2, and 3 ft. depths. Water passed through the columns was also analyzed. During the experiment, 3-4 samples of water were taken depending on the type of soil. The volume of each sample was measured and the major parameters were determined (Table 7).

TABLE 7

| Type of Water | Type of Soil | Sample # | Volume, L | pH | EC, mS/cm | TDS, g/L | Na, ppm | Ca, ppm | Mg, ppm | Cl ppm | SO4, ppm |
|---|---|---|---|---|---|---|---|---|---|---|---|
| MTW | Sandy Loam | 1 | 1.24 | 7.83 | 55.3 | 76.2 | 10464 | 3052 | 845 | 21018 | 1616 |
|  |  | 2 | 2.72 | 8.35 | 20.3 | 18.8 | 4194 | 986 | 252 | 6311 | 1040 |
|  |  | 3 | 4.29 | 8.88 | 4.29 | 3.28 | 1023 | 120 | 27 | 446 | 425 |
| Control (NT) |  | 1 | 0.93 | 7.27 | 87.9 | 121.2 | 16487 | 5279 | 1525 | 35903 | 2271 |
|  |  | 2 | 2.70 | 8.52 | 13.7 | 11.9 | 3023 | 672 | 150 | 3556 | 995 |
|  |  | 3 | 4.02 | 8.87 | 4.02 | 3.06 | 994 | 110 | 21 | 390 | 420 |
| MTW | Silt Loam | 1 | 0.83 | 7.63 | 13.0 | 11.1 | 711 | 1333 | 521 | 1555 | 2407 |
|  |  | 2 | 0.62 | 7.79 | 10.95 | 9.19 | 732 | 1069 | 428 | 1280 | 2019 |
|  |  | 3 | 3.00 | 7.98 | 5.91 | 4.63 | 323 | 624 | 225 | 639 | 1470 |
|  |  | 4 | 2.07 | 8.36 | 2.90 | 2.15 | 159 | 268 | 81 | 401 | 814 |
| Control (NT) |  | 1 | 0.75 | 7.67 | 12.9 | 11.0 | 674 | 1364 | 511 | 1515 | 2328 |
|  |  | 2 | 0.98 | 7.92 | 9.48 | 7.83 | 640 | 954 | 371 | 1076 | 1906 |
|  |  | 3 | 2.89 | 7.87 | 5.77 | 4.52 | 317 | 606 | 215 | 632 | 1423 |
|  |  | 4 | 2.55 | 8.26 | 2.79 | 2.05 | 149 | 258 | 76 | 392 | 767 |
| MTW | Silty Clay | 1 | 0.66 | 8.04 | 16.77 | 14.86 | 1279 | 1131 | 704 | 5486 | 1302 |
|  |  | 2 | 0.50 | 8.46 | 10.29 | 8.58 | 751 | 759 | 415 | 2933 | 3570 |
|  |  | 3 | 2.60 | 8.42 | 3.65 | 2.67 | 379 | 240 | 109 | 653 | 633 |
|  |  | 4 | 1.67 | 8.52 | 2.46 | 1.80 | 164 | 245 | 74 | 412 | 518 |
| Control (NT) |  | 1 | 0.89 | 7.88 | 14.06 | 12.20 | 850 | 1160 | 544 | 4691 | 791 |
|  |  | 2 | 0.91 | 8.39 | 5.78 | 5.54 | 660 | 411 | 192 | 1471 | 667 |
|  |  | 3 | 3.62 | 8.32 | 2.35 | 1.71 | 268 | 152 | 57 | 364 | 462 |
|  |  | 4 | 2.32 | 8.41 | 2.33 | 1.60 | 176 | 269 | 79 | 396 | 528 |

Silty loam has moderate infiltration rates when thoroughly wetted and consists chiefly of moderately well to well-drained soils with moderately fine to moderately coarse textures. "Silty Clay", representing group D, has very low infiltration rates and consists chiefly of clay soils with a high swelling potential.

Three columns (control) were watered with well water (Table 5) and three other columns were irrigated by treated well water. Experiments were conducted in PVC columns with a diameter of 6 inches and length of 3 ft.

Sandy loam was spiked by a sodium chloride solution to increase its sodium concentration in order to check the effect of the treated water on this cation. Every day, half a liter of water was poured into each column. One gallon reservoirs were placed under each column to collect passed water. Initial soil parameters were measured (Table 6).

| pH | EC, mS/cm | Cl, ppm | Na, ppm | Ca, ppm | Mg, ppm | HCO3, ppm |
|---|---|---|---|---|---|---|
| 7.51 | 1.91 | 286.5 | 148.8 | 173.7 | 70.8 | 249 |

TABLE 6

| Type of Soil | EC, dS/m | pH | OM, % |
|---|---|---|---|
| Sandy Loam | 4440 | 7.61 | 6.0 |
| Silt Loam | 682 | 7.03 | 1.6 |
| Silty Clay | 946 | 7.86 | 1.7 |

Figure 8:
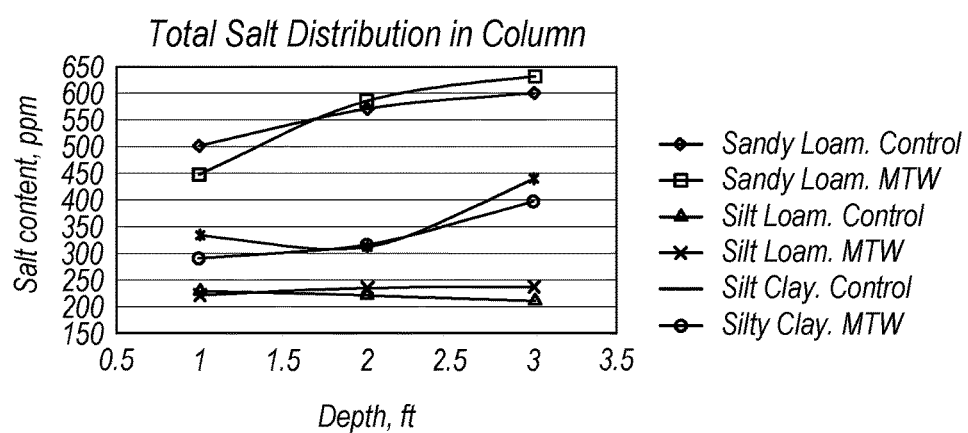
FIG. 8 illustrates total salt distribution in soil columns as a function of soil type.

Soil that received treated water exhibited a lower salt content in the first few feet of depth (the root zone). All three types of soil had a similar signature of salt distribution (FIG. 8). Soil after treatment exhibited a higher concentration of salts at depths of 3 ft. and greater and soil in the control group exhibited a higher concentration of salts in the root zone. These results demonstrate that treated water flushed out more salts thus developing more favorable conditions for plants sensitive to sodium concentrations. Also of interest was the distribution of various cations in the soil. The first few feet of the soil that received treated water had less sodium and chloride and more calcium and magnesium. Thus, the sodium adsorption ratio (SAR) was smaller for treated soil compared to control soil.

SAR indicates the degree of infiltration of a soil. SAR is ideal when below 3 and acceptable when in the range 3-7. Sodium and chloride washed out faster for the first drain when soil had a high concentration of salts. Comparison of summarized data is presented in Table 8.

TABLE 8

| Type of Soil | Infiltration | Sodium in drain compare to control, % | Moisture of soil compare to control, % | Sodium reduction in root zone, % | Chloride reduction in root zone, % | SAR in root zoone Control | MTW |
|---|---|---|---|---|---|---|---|
| Sandy Loam | High | 4.7 | Reduced 8.1 | 26 | 13.7 | 6.46 | 2.78 |
| Silt Loam | Moderate | 16.8 | Increased 9.1 | 4.1 | 16.9 | 1.18 | 1.15 |
| Silty Clay | Very low | 11.6 | Increased 29.8 | 40 | 38 | 5.36 | 3.95 |

The impact of treated water on salt distribution depended on the soil type. Treated water had a lower effect in soil with high infiltration rates and a higher effect in soil with low infiltration. For example, sandy loam had the lowest difference in sodium concentrations (in the drain) between the control group and the treated group (4.7%). At the same time, the sodium concentration in sandy loam was dramatically reduced in the root zone (26%) and SAR dropped from 6.46 to 2.78 which is ideal for agriculture. Silty loam had more sodium (as compared to the control group) in the drain but sodium in the root zone dropped by only 4.1%; i.e. sodium was mostly removed from the depth below the root zone. The best result was obtained for the soil with worst infiltration—silty clay. Sodium and chloride concentrations in the root zone were reduced by 40% and 38% respectively and sodium concentration in the drain was 11.6% higher when compared to control. Thus, the results support the claim that WWTS removes excess soluble salts.

Similar results were obtained regarding water absorption in soil. Soil with high infiltration did not show a positive increase in soil moisture. Opposite results were obtained for soils with moderate (Silt loam) and low (Silty clay) infiltration showing a significant increase of the moisture content in the soil (9.1 and 29.8% respectively).

Treatment did not lower pH values of soil layers. Table 9 presents the pH of soils at different depths. It can be seen that pH was lower only for sandy loam. Silt loam and silt clay had higher pH at all three depths.

TABLE 9

| Type of Soil | Initial pH | Depth, ft | pH Control group | pH MTW |
|---|---|---|---|---|
| Sandy Loam | 7.61 | 1 | 7.53 | 7.27 |
| | | 2 | 8.08 | 8.09 |
| | | 3 | 8.10 | 8.11 |
| Silt Loam | 7.03 | 1 | 7.54 | 7.53 |
| | | 2 | 7.37 | 7.44 |
| | | 3 | 7.43 | 7.55 |
| Silty Clay | 7.86 | 1 | 8.14 | 7.98 |
| | | 2 | 8.20 | 8.10 |
| | | 3 | 8.16 | 8.11 |

Plant Physiology

Experiment 1—Wellspring Facility

The Wellspring facility experiment was conducted with lettuce, *Lolla Rossa*. Lettuce seedlings (two weeks of age) were purchased from a supplier in San Marcos, Calif. Thirty-two (32) plants were grown for one month in one gallon pots to determine the impact of WWTS treated water on plant and soil parameters. Plants were grown in four (4) different types of soil (Table 10) that are classified based on their respective runoff potentials (A, B, C, and D) where A's generally have the smallest runoff potential and D's greatest. The representative of group A was "sandy loam". Group B was represented by "silty loam". Group C was represented by "sandy clay" with low infiltration rates when thoroughly wetted and consisting chiefly of soils with a layer that impedes downward movement of water and soils with moderately fine to fine structure. "Silty Clay", representing group D, has very low infiltration rates and consists chiefly of clay soils with a high swelling potential.

TABLE 10

| Group | Type of Soil | EC, dS/m | pH | MO, % |
|---|---|---|---|---|
| A | Sandy Loam | 0.85 | 8.12 | 2.23 |
| B | Silt Loam | 0.68 | 7.03 | 1.61 |
| C | Sandy Clay | 2.21 | 7.55 | 3.39 |
| D | Silty Clay | 0.96 | 7.86 | 1.73 |

Plants were grown in eight lines with each line having four pots with plants. Four lines contained control groups for each type of soil and were irrigated with untreated well water. Four remaining lines contained treatment groups for each type of soil and were irrigated by the same treated well water. Before irrigation, well water was pumped through WWTS for 30 min in a recirculation loop. Two hundred milliliters of water were added to each pot daily, the amount of water considered optimal for the plants. After one month, the plants were removed from the pots and basic yield parameters (mass of leaves (in grams), number of leaves, plant height and length of roots) were evaluated, as were the levels of key macro nutrient concentrations in plant tissue and soil. The water parameters are presented in Table 11.

TABLE 11

| Analyte, mg/L | Concentration |
|---|---|
| Cations: | |
| Calcium | 173.7 |
| Magnesium | 71.8 |
| Potassium | 7.0 |
| Sodium | 150.8 |
| Anions: | |
| Chloride | 286.3 |
| Nitrate as N | 5.3 |
| Sulfate | 369.9 |
| Bicarbonate | 249 |
| Total Alkalinity as $CaCO_3$ | 204 |
| pH | 7.51 |
| EC, mS/cm | 1.91 |

Results showed that the basic yield parameters of plants irrigated with WWTS water were higher than the control group in three of four soils (silty loam, sandy clay and silty clay). Sandy Loam, the soil type that is most porous and has the lowest runoff potential, was essentially unchanged between control and treatment groups. Basic yield parameters are presented in Table 12.

TABLE 12

| Soil | Group | Leaves, g | Height, cm | Length of Roots, cm | Number of Leaves |
|---|---|---|---|---|---|
| Group A. Sandy Loam | WWTS | 7.10 ± 2.42 | 17.50 ± 6.19 | 11.75 ± 1.50 | 13.00 ± 4.24 |
| | Control | 7.53 ± 0.83 | 21.00 ± 6.38 | 12.25 ± 2.63 | 12.00 ± 1.41 |
| Group B. Silt Loam | WWTS | 11.35 ± 2.90 | 27.00 ± 4.08 | 13.75 ± 1.50 | 13.25 ± 3.86 |
| | Control | 8.26 ± 0.64 | 23.35 ± 3.40 | 11.50 ± 2.38 | 11.25 ± 0.96 |
| Group C. Sandy Clay | WWTS | 11.36 ± 3.57 | 24.00 ± 3.74 | 12.25 ± 0.50 | 15.00 ± 3.16 |
| | Control | 9.46 ± 1.61 | 23.00 ± 1.00 | 11.67 ± 0.58 | 11.33 ± 2.31 |
| Group D. Silty Clay | WWTS | 12.58 ± 3.10 | 25.00 ± 4.32 | 13.00 ± 2.16 | 17.50 ± 2.65 |
| | Control | 7.06 ± 3.31 | 20.00 ± 5.72 | 11.00 ± 4.32 | 11.00 ± 3.56 |

A leaf analysis of macro nutrient concentrations of all plants grown in the four different soils is presented in Table 13. Notably, the concentration of zinc was higher in all four groups. Zinc plays an important role in many biological processes. It is essential for the normal growth and reproduction of all higher plants. In addition, it plays a key role during physiological growth and fulfills an immune function. It is vital for the functionality of more than 300 enzymes, for the stabilization of DNA and for gene expression. In general, zinc is believed to play a main role in the synthesis of proteins, enzyme activating, oxidation and revival reactions and metabolism of carbohydrates.

TABLE 13

| Test Description | WWTS | Control | Unit | Optimum Range |
|---|---|---|---|---|
| A. Sandy Loam | | | | |
| Macro Nutrients | | | | |
| Total Nitrogen (Leaf) | 2.9 | 3.0 | % | 2.5-4.5 |
| Phosphorus (Leaf) | 0.33 | 0.38 | % | 0.3-0.7 |
| Potassium (Leaf) | 3.65 | 3.65 | % | 2.5-4.0 |
| Calcium (Leaf) | 1.54 | 1.59 | % | 2.5-5.0 |
| Magnesium (Leaf) | 0.33 | 0.47 | % | 0.3-1.5 |
| Micro Nutrients | | | | |
| Zinc (Leaf) | 53 | 38 | ppm | 20-60 |
| Manganese (Leaf) | 90 | 94 | ppm | 60-400 |
| Iron (Leaf) | 126 | 119 | ppm | 50-300 |
| Sodium (Leaf) | 0.93 | 0.95 | % | 0.0-0.35 |
| B. Silty Loam | | | | |
| Macro Nutrients | | | | |
| Total Nitrogen (Leaf) | 3.1 | 3.1 | % | 2.5-4.5 |
| Phosphorus (Leaf) | 0.46 | 0.49 | % | 0.3-0.7 |
| Potassium (Leaf) | 4.89 | 5.59 | % | 2.5-4.0 |
| Calcium (Leaf) | 1.18 | 1.45 | % | 2.5-5.0 |
| Magnesium (Leaf) | 0.30 | 0.45 | % | 0.3-1.5 |
| Micro Nutrients | | | | |
| Zinc (Leaf) | 54 | 38 | ppm | 20-60 |
| Manganese (Leaf) | 53 | 52 | ppm | 60-400 |
| Iron (Leaf) | 105 | 120 | ppm | 50-300 |
| Sodium (Leaf) | 0.80 | 0.60 | % | 0.0-0.35 |
| C. Sandy Clay | | | | |
| Macro Nutrients | | | | |
| Total Nitrogen (Leaf) | 3.3 | 2.9 | % | 2.5-4.5 |
| Phosphorus (Leaf) | 0.43 | 0.38 | % | 0.3-0.7 |
| Potassium (Leaf) | 5.21 | 4.56 | % | 2.5-4.0 |
| Calcium (Leaf) | 1.84 | 1.61 | % | 2.5-5.0 |
| Magnesium (Leaf) | 0.45 | 0.45 | % | 0.3-1.5 |
| Micro Nutrients | | | | |
| Zinc (Leaf) | 46 | 33 | ppm | 20-60 |
| Manganese (Leaf) | 53 | 60 | ppm | 60-400 |
| Iron (Leaf) | 124 | 115 | ppm | 50-300 |
| Sodium (Leaf) | 0.81 | 0.82 | % | 0.0-0.35 |
| D. Silty Clay | | | | |
| Macro Nutrients | | | | |
| Total Nitrogen (Leaf) | 3.2 | 2.8 | % | 2.5-4.5 |
| Phosphorus (Leaf) | 0.49 | 0.43 | % | 0.3-0.7 |
| Potassium (Leaf) | 4.79 | 4.02 | % | 2.5-4.0 |
| Calcium (Leaf) | 1.45 | 1.65 | % | 2.5-5.0 |
| Magnesium (Leaf) | 0.44 | 0.54 | % | 0.3-1.5 |
| Micro Nutrients | | | | |
| Zinc (Leaf) | 50 | 10 | ppm | 20-60 |
| Manganese (Leaf) | 79 | 82 | ppm | 60-400 |
| Iron (Leaf) | 114 | 111 | ppm | 50-300 |
| Sodium (Leaf) | 0.87 | 1.26 | % | 0.0-0.35 |

Soil analysis (Table 14) revealed important differences between the treatment and control groups. First, pH increased in all four types of soil. The comparison of the total amount of salts in the soil of the two groups (control and treated water) showed that the control group had lower salt concentrations than the treatment group. Prior studies have shown that WWTS treatment is most effective when soil has a high sodium content and low permeability. When WWTS is used in relatively good soil with low salt levels the impact of WWTS treatment is reduced.

TABLE 14

Table 4.5 Soil Analysis

| | EC, dS/m | pH | Cl, ppm | NO3—N, ppm | SO4—S, ppm | Na, ppm | K, ppm | Ca, ppm | Mg, ppm | Sodium Adsorption Ratio |
|---|---|---|---|---|---|---|---|---|---|---|
| Sandy Loam | | | | | | | | | | |
| Control | 0.93 | 8.22 | 160 | ND | 101 | 214 | 0.9 | 137 | 56 | 3.88 |
| WWTS | 1.07 | 8.19 | 190 | ND | 100 | 240 | 0.8 | 137 | 54 | 4.38 |
| Silty Loam | | | | | | | | | | |
| Control | 0.46 | 7.78 | 85 | 0.8 | 34 | 65 | 1.7 | 71 | 26 | 1.67 |
| WWTS | 0.54 | 7.80 | 105 | 2.0 | 40 | 86 | 1.8 | 77 | 27 | 2.14 |
| Sandy Clay | | | | | | | | | | |
| Control | 1.30 | 7.92 | 185 | 1.0 | 172 | 205 | 6.0 | 257 | 74 | 2.89 |
| WWTS | 1.06 | 8.07 | 150 | 1.2 | 156 | 175 | 3.5 | 242 | 68 | 2.55 |
| Silty Clay | | | | | | | | | | |
| Control | 0.59 | 8.19 | 100 | 0.8 | 46 | 195 | 3.9 | 49 | 22 | 5.79 |
| WWTS | 0.79 | 7.92 | 140 | 0.8 | 74 | 258 | 1.5 | 64 | 32 | 6.55 |

Additional experiments were conducted to determine water productivity. Five (5) plants of each group, control and treatment, were irrigated by 75% of the volume of water applied in the earlier experiment (150 ml/plant) and five (5) other lettuce plants of each group were irrigated by 50% of the volume of water applied in the earlier experiment (100 ml/plant) for one month. Plants were grown in sandy clay soil. These groups were then compared to the results obtained in the earlier experiment in the group irrigated at 100% of the optimal water amount (treatment and control) in the same soil type over one month. It is important to note that 200 ml/plant/day is considered the optimal amount of irrigation for the plants. After one month the plants were removed and basic yield parameters were again evaluated and chemical analysis of plant tissues and soil were conducted (Table 15, 16, 17). A comparison of basic yield parameters showed that plants irrigated with treated water exhibited greater yields at all irrigation levels.

TABLE 15

| Soil | Group | Leaves, g | Height, cm | Length of Roots, cm | Number of Leaves |
|---|---|---|---|---|---|
| Sandy Clay 50% | WWTS | 10.26 ± 3.47 | 17.40 ± 11.01 | 10.80 ± 3.77 | 10.80 ± 3.63 |
| | Control | 7.50 ± 2.39 | 14.80 ± 4.21 | 10.01 ± 1.58 | 8.40 ± 2.88 |
| Sandy Clay 75% | WWTS | 17.39 ± 4.56 | 32.80 ± 10.99 | 9.00 ± 1.22 | 14.20 ± 4.82 |
| | Control | 9.26 ± 1.91 | 21.00 ± 5.05 | 11.80 ± 2.28 | 11.28 ± 3.49 |
| Sandy Clay 100% | WWTS | 11.36 ± 3.57 | 24.00 ± 3.74 | 12.25 ± 0.50 | 15.00 ± 3.16 |
| | Control | 9.46 ± 1.61 | 23.00 ± 1.00 | 11.67 ± 0.58 | 11.33 ± 2.31 |

TABLE 16

| Test Description | WWTS | Control | Unit | Optimum Range |
|---|---|---|---|---|
| A. 50% Irrigation | | | | |
| Macro Nutrients | | | | |
| Total Nitrogen (Leaf) | 3.0 | 2.9 | % | 2.5-4.5 |
| Phosphorus (Leaf) | 0.62 | 0.52 | % | 0.3-0.7 |
| Potassium (Leaf) | 4.93 | 4.03 | % | 2.5-4.0 |
| Calcium (Leaf) | 1.55 | 1.90 | % | 2.5-5.0 |
| Magnesium (Leaf) | 0.67 | 0.58 | % | 0.3-1.5 |

TABLE 16-continued

| Test Description | WWTS | Control | Unit | Optimum Range |
|---|---|---|---|---|
| Micro Nutrients | | | | |
| Zinc (Leaf) | 70 | 45 | ppm | 20-60 |
| Manganese (Leaf) | 185 | 121 | ppm | 60-400 |
| Iron (Leaf) | 198 | 152 | ppm | 50-300 |
| Sodium (Leaf) | 1.63 | 1.47 | % | 0.0-0.35 |
| B. 75% irrigation | | | | |
| Macro Nutrients | | | | |
| Total Nitrogen (Leaf) | 3.5 | 3.0 | % | 2.5-4.5 |
| Phosphorus (Leaf) | 0.38 | 0.54 | % | 0.3-0.7 |
| Potassium (Leaf) | 4.68 | 4.91 | % | 2.5-4.0 |
| Calcium (Leaf) | 1.26 | 1.81 | % | 2.5-5.0 |
| Magnesium (Leaf) | 0.44 | 0.57 | % | 0.3-1.5 |

TABLE 16-continued

| Test Description | WWTS | Control | Unit | Optimum Range |
|---|---|---|---|---|
| Micro Nutrients | | | | |
| Zinc (Leaf) | 84 | 30 | ppm | 20-60 |
| Manganese (Leaf) | 106 | 88 | ppm | 60-400 |
| Iron (Leaf) | 163 | 150 | ppm | 50-300 |
| Sodium (Leaf) | 1.33 | 1.19 | % | 0.0-0.35 |

TABLE 16-continued

| Test Description | WWTS | Control | Unit | Optimum Range |
|---|---|---|---|---|
| C. 100% Irrigation | | | | |
| Macro Nutrients | | | | |
| Total Nitrogen (Leaf) | 3.3 | 2.9 | % | 2.5-4.5 |
| Phosphorus (Leaf) | 0.43 | 0.38 | % | 0.3-0.7 |
| Potassium (Leaf) | 5.21 | 4.56 | % | 2.5-4.0 |
| Calcium (Leaf) | 1.84 | 1.61 | % | 2.5-5.0 |
| Magnesium (Leaf) | 0.45 | 0.45 | % | 0.3-1.5 |
| Micro Nutrients | | | | |
| Zinc (Leaf) | 46 | 33 | ppm | 20-60 |
| Manganese (Leaf) | 53 | 60 | ppm | 60-400 |
| Iron (Leaf) | 124 | 115 | ppm | 50-300 |
| Sodium (Leaf) | 0.81 | 0.82 | % | 0.0-0.35 |

TABLE 17

(Volume of Irrigation - 50%, 75%, and 100%)

| | EC, dS/m | pH | Cl, ppm | NO3—N, ppm | SO4—S, ppm | Na, ppm | K, ppm | Ca, ppm | Mg, ppm | Sodium Adsorption Ratio |
|---|---|---|---|---|---|---|---|---|---|---|
| 50% | | | | | | | | | | |
| Control | 2.30 | 7.92 | 340 | 23 | 294 | 299 | 5 | 442 | 121 | 3.24 |
| WWTS | 2.61 | 7.71 | 420 | 30 | 382 | 364 | 8 | 554 | 150 | 3.88 |
| 75% | | | | | | | | | | |
| Control | 2.05 | 7.92 | 325 | 14 | 315 | 287 | 3 | 470 | 123 | 3.04 |
| WWTS | 2.81 | 7.79 | 330 | 7 | 352 | 298 | 3 | 515 | 134 | 3.02 |
| 100% | | | | | | | | | | |
| Control | 1.30 | 7.92 | 185 | 1.0 | 172 | 205 | 6 | 257 | 74 | 2.89 |
| WWTS | 1.06 | 8.07 | 150 | 1.2 | 156 | 175 | 3 | 242 | 68 | 2.55 |

Chemical analysis revealed that concentrations of microelements were higher in the treatment group of plants. Zinc concentrations in the treatment group increased from 46 ppm to 70 ppm, manganese increased from 53 ppm to 185 ppm and iron increased from 124 ppm to 198 ppm when the volume of irrigation water was reduced from 100% to 50%. Increases were also noted in the control group, although not as significant. Lack of irrigation creates a strong stress factor on plants and they try to compensate for lack of water by taking up more solutes from the soil. As a result, they also uptake more nutrients. Treated water demonstrated significantly higher levels of permeability and consequently, plants expended less energy to uptake solutes leading to a larger yield and stronger plants.

Soil analysis showed a higher concentration of ions in the treatment group. Although less significant when dealing with relatively good soil (SAR<7) where salt increases cannot impact the final yield, it could be of great significance when dealing with soil containing high, yield impacting, SAR levels. The fact that the treatment group had higher ion concentrations suggests soil from the treatment group retains more water (such that fewer ions were flushed out) and soil becomes moister than in the control group. In turn, these changes create conditions in which plants can more readily uptake nutrients.

Experiment 2—Lucky Growers (San Marcos, June 2015, Squash)

An experimental field, approximately 450 ft. by 40 ft., covered by a green house, was split into two parts. One part was irrigated by treated well water and the second part was irrigated by untreated well water (control group, NT). The experiment began when the squash plants were about two weeks old. Parameters of the irrigation (well) water are presented in Table 18.

TABLE 18

| Analyte | Method | Results | DLR | Units |
|---|---|---|---|---|
| Total Metals: | | | | |
| Calcium | IC Method | 131.1 | 0.03 | mg/L |
| Magnesium | IC Method | 88.6 | 0.03 | mg/L |
| Potassium | IC Method | 8.5 | 0.1 | mg/L |
| Sodium | IC Method | 85.7 | 0.1 | mg/L |
| Total Iron | 3500-Fe B | 0.06 | 0.02 | mg/L |
| Manganese | PAN method | 0.03 | 0.005 | mg/L |

TABLE 18-continued

| Analyte | Method | Results | DLR | Units |
|---|---|---|---|---|
| Aluminum | 3500-Al B | No | 0.01 | mg/L |
| Zinc | 3500-Zn | 0.16 | 0.009 | mg/L |
| Cupper | Bicinchohite method | No | 0.02 | mg/L |
| Anions: | | | | |
| Chloride | 4110 B | 231.3 | 0.25 | mg/L |
| Nitrate as N | 4110 B | 27.8 | 0.3 | mg/L |
| Fluoride | 4500-F$^-$ D. | 2.23 | 0.04 | mg/L |
| Sulfate | 4110 B | 207.6 | 0.1 | mg/L |
| Phosphate | 4110 B | No | 0.06 | mg/L |
| Total Alkalinity Bicarbonate | 2320B | 229 | 5 | mg/L |
| Total Alkalinity as $CaCO_3$ | | 188 | 5 | mg/L |
| pH | 4500H | 7.40 | 0.01 | NA |
| Specific Conductance | 2510B | 1.58 | 0.1 | mS/cm |
| Total Dissolved Solids | 2540C | 1110 | 10 | mg/L |
| Silica | 4500-$SiO_2$C | 69.1 | 0.1 | mg/L |

Soil and plant tissue samples were collected on the $1^{st}$, $7^{th}$, and $30^{th}$ day of the experiment. Soil and leaves were collected randomly throughout the field from both sections of the growing area (WWTS and NT). A total of 20 soil cores and 20 leaves from each half of the field were collected. During the first thirty days both sides (WWTS and NT) of the field were irrigated 7 times per day for 4 min. at 10 gpm. The total amount of applied water was 280 gal. Fertilizer was added to water applied to the NT (control) side of the field. Fertilizers included different salts of nitrate, phosphoric acid, mono ammonium phosphate, and micronutrients. The N:P:K ratio was approximately 2:1:2. No fertilizer was added to the treatment side of the field.

Soil analysis showed (Table 19) that the NT part of the field initially had a higher concentration of salts. However, the concentration was insignificant for squash which has a high salt tolerance and is not impacted by an EC below 4.7 dS/cm.

between control and treatment fields. However, a comparison of major nutrients (N,P,K) in the soil showed that the treated part of the field initially contained much lower levels of macro elements and amounts generally declined during the field test (Table 21). In contrast, the concentration of macro elements increased in the part of the field not treated, presumably due to the added fertilizer.

TABLE 19

(Soluble (S) and Extractable (E) Ions)

| | EC, dS/m | pH | Cl, ppm | NO3—N, ppm | SO4—S, ppm | Na, ppm | K, ppm | Ca, ppm | Mg, ppm | P, ppm | Sodium Adsorption Ratio |
|---|---|---|---|---|---|---|---|---|---|---|---|
| Sample 1st Day | | | | | | | | | | | |
| NT | 3.14 | 6.46 | 791 | 163 | 246 | 373 (S) | 231 (S) | 458 (S) | 306 (S) | 76 | 4.39 |
| | | | | | | 360 (E) | 314 (E) | 2746 (E) | 912 (E) | | |
| WWTS | 1.41 | 6.53 | 319 | 80 | 89 | 137 (S) | 64 (S) | 221 (S) | 131 (S) | 64 | 1.80 |
| | | | | | | 140 (E) | 106 (E) | 2105 (E) | 586 (E) | | |
| Sample 7th Day | | | | | | | | | | | |
| NT | 4.28 | 6.47 | 1018 | 232 | 287 | 435 (S) | 267 (S) | 594 (S) | 422 (S) | 77 | 3.38 |
| | | | | | | 441 (E) | 348 (E) | 2826 (E) | 1049 (E) | | |
| WWTS | 1.47 | 7.01 | 339 | 37 | 98 | 175 (S) | 24 (S) | 203 (S) | 125 (S) | 31 | 2.41 |
| | | | | | | 274 (E) | 69 (E) | 2249 (E) | 696 (E) | | |
| Sample 30th Day | | | | | | | | | | | |
| NT | 5.46 | 6.23 | 1504 | 240 | 239 | 675 (S) | 197 (S) | 748 (S) | 573 (S) | 86 | 4.50 |
| | | | | | | 683 (E) | 271 (E) | 2936 (E) | 1124 (E) | | |
| WWTS | 2.36 | 6.83 | 668 | 103 | 174 | 301 (S) | 47 (S) | 365 (S) | 243 (S) | 34 | 3.92 |
| | | | | | | 260 (E) | 85 (E) | 2147 (E) | 668 (E) | | |

Soil analysis showed that by day 30 the accumulation (increase from baseline) of sodium and chloride in the root zone was twice as high in the field where untreated water was applied. Soluble sodium accumulation was 297/164=1.8 times higher and soluble chloride accumulation was 713/349=2.0 times higher in soil in the untreated area (Table 20) suggesting treated water flushed out sodium chloride from the plant's root zone and created more beneficial conditions for plants.

TABLE 20

| Ion | Water | Initial Concentration, ppm | Final Concentration, ppm | Difference, ppm | Ratio, Times |
|---|---|---|---|---|---|
| Na | WWTS | 378 | 675 | 297 | 1.8 |
| | NT | 137 | 301 | 164 | |
| Cl | WWTS | 791 | 1504 | 713 | 2.0 |
| | NT | 319 | 668 | 349 | |

TABLE 21

| Macro element, ppm | NT Day 1 | NT Day 7 | NT Day 30 | WWTS Day 1 | WWTS Day 7 | WWTS Day 30 | Recommended Range |
|---|---|---|---|---|---|---|---|
| Potassium | 231 | 267 | 197 | 64 | 24 | 47 | 273-407 |
| Nitrogen | 163 | 232 | 240 | 80 | 37 | 103 | 120-180*/ |
| Phosphorus | 76 | 77 | 86 | 64 | 31 | 34 | 35-75 |

*/at bull density 1.2 g/cc

Plant tissue (leaf) analysis (Table 22) did not show significant differences in macro nutrient concentrations

TABLE 22

| 1st Day | Concentration | Unit | Optimum Range |
|---|---|---|---|
| Macro Nutrients | | | |
| Total Nitrogen (Leaf) | 2.7 | % | 2.5-4.5 |
| Phosphorus (Leaf) | 0.88 | % | 0.3-0.7 |
| Potassium (Leaf) | 4.28 | % | 2.5-4.0 |
| Calcium (Leaf) | 1.25 | % | 2.5-5.0 |
| Magnesium (Leaf) | 0.70 | % | 0.3-1.5 |
| Micro Nutrients | | | |
| Zinc (Leaf) | 61 | ppm | 20-60 |
| Manganese (Leaf) | 62 | ppm | 60-400 |
| Iron (Leaf) | 97 | ppm | 50-300 |
| Copper (Leaf) | 16 | ppm | 8-20 |
| Sodium (Leaf) | 0.08 | % | 0.0-0.35 |

| 7th day | WWTS | NT | Unit | Optimum Range |
|---|---|---|---|---|
| Macro Nutrients | | | | |
| Total Nitrogen (Leaf) | 3.2 | 2.6 | % | 2.5-4.5 |
| Phosphorus (Leaf) | 1.07 | 0.95 | % | 0.3-0.7 |
| Potassium (Leaf) | 4.15 | 5.87 | % | 2.5-4.0 |
| Calcium (Leaf) | 6.45 | 6.31 | % | 2.5-5.0 |
| Magnesium (Leaf) | 2.61 | 2.64 | % | 0.3-1.5 |
| Micro Nutrients | | | | |
| Zinc (Leaf) | 61 | 45 | ppm | 20-60 |
| Manganese (Leaf) | 76 | 70 | ppm | 60-400 |
| Iron (Leaf) | 248 | 223 | ppm | 50-300 |
| Copper (Leaf) | 36 | 35 | ppm | 8-20 |
| Sodium (Leaf) | 0.04 | 0.17 | % | 0.0-0.35 |

TABLE 22-continued

| 30th Day | WWTS | NT | Unit | Optimum Range |
|---|---|---|---|---|
| Macro Nutrients | | | | |
| Total Nitrogen (Leaf) | 2.5 | 3.1 | % | 2.5-4.5 |
| Phosphorus (Leaf) | 1.01 | 1.03 | % | 0.3-0.7 |
| Potassium (Leaf) | 3.06 | 3.81 | % | 2.5-4.0 |
| Calcium (Leaf) | 5.52 | 5.55 | % | 2.5-5.0 |
| Magnesium (Leaf) | 2.09 | 2.35 | % | 0.3-1.5 |
| Micro Nutrients | | | | |
| Zinc (Leaf) | 66 | 67 | ppm | 20-60 |
| Manganese (Leaf) | 86 | 66 | ppm | 60-400 |
| iron (Leaf) | 185 | 203 | ppm | 50-300 |
| Copper (Leaf) | 32 | 24 | ppm | 8-20 |
| Sodium (Leaf) | 0.07 | 0.04 | % | 0.0-0.35 |

Despite the low N-P-K concentrations in the soil of the treated area, leaves on the plants irrigated with treated water did not show any deficit of macro or microelements. This suggests that plants more readily uptake required nutrients from relatively poor soil when irrigated with treated water. In other words, treated water increased the efficiency of the uptake process. The water content of fruit given treated water was also compared to fruit given control water. It was found that fruit from the treated part of the field contained 4.8±0.9% more water than plants from the untreated area. Finally, at the end of the experiment the yield of fruit in the control group at the end of the experiment was 41 boxes compared to 58 boxes in the group irrigated by WWTS (each box held 50 squash), a greater than 41% increase.

Experiment 3—Stone Residence, Orange Trees
(May, 2015)

Prior to the experiment, all orange trees were irrigated with municipal water. During the experiment, trees were split into two groups. The first group was irrigated by treated well water and the second group was irrigated by untreated, municipal water. The major parameters of the water types are presented in Table 23 below:

TABLE 23

| Water | EC, mS/cm | pH | Chloride, ppm | Sodium, ppm |
|---|---|---|---|---|
| Municipal | 0.82 | 8.11 | 80.4 | 82.5 |
| Well | 3.78 | 7.16 | 784.3 | 530.8 |

TABLE 24

| Sample | EC, dS/m | pH | Cl, ppm | NO3—N, ppm | SO4—S, ppm | NA, ppm | K, ppm | Ca, ppm | Mg, ppm | P, ppm | Sodium Adsorption Ratio |
|---|---|---|---|---|---|---|---|---|---|---|---|
| NT | 1.14 | 5.56 | 160 | 1.5 | 151 | 215 (S) | 140 (S) | 174 (S) | 43 (S) | 7 | 3.76 |
| | | | | | | 279 (E) | 283 (E) | 2436 (E) | 417 (E) | | |
| WWTS | 3.44 | 4.42 | 253 | 54 | 1050 | 273 (S) | 367 (S) | 1720 (S) | 247 (S) | 5 | 1.65 |
| | | | | | | 321 (E) | 469 (E) | 3547 (E) | 418 (E) | | |

Soluble (S) and Extractable (E) Ions

TABLE 25

| Test Description | irrigated by City Water | Irrigated by MTW | Units | Optimum Range |
|---|---|---|---|---|
| Macro Nutrients | | | | |
| Total Nitrogen (Leaf) | 2.15 | 2.22 | % | 2.4-2.6 |
| Phosphorus (Leaf) | 0.11 | 0.11 | % | 0.12-0.16 |
| Potassium (Leaf) | 0.85 | 1.05 | % | 0.7-1.1 |
| Calcium (Leaf) | 2.71 | 2.39 | % | 3.0-5.5 |
| Magnesium (Leaf) | 0.19 | 0.22 | % | 0.26-0.60 |
| Micro Nutrients | | | | |
| Zinc (Leaf) | 30 | 64 | ppm | 25-100 |
| Manganese (Leaf) | 19 | 29 | ppm | 25-200 |
| Iron (Leaf) | 305 | 117 | ppm | 60-120 |
| Copper (Leaf) | 21 | 25 | ppm | 5-16 |
| Sodium (Leaf) | 0.19 | 0.05 | % | 0.0-0.16 |

Soil and plant tissue samples were collected after two weeks. Results of the analyses are presented in Table 24 and 25. Data showed that soil pH in the treatment group was dramatically reduced, from 5.56 to 4.42 and at the same time, some salts were dissolved. Concentrations of soluble ions increased and extractable ions decreased such that the ratios of extractable/soluble ions changed from 8.7 to 1.7 for calcium, from 14 to 2 for magnesium, and from 2 to 1.3 for potassium.

The increase of soluble calcium and magnesium decreased the Sodium Adsorption Ration (SAR). After treatment, SAR dropped reaching the "Ideal" value of 1.65. This optimal SAR provides for a higher rate of soil permeability and infiltration. Despite the fact that the EC of the well water was much higher than municipal water, concentrations of sodium and chloride in soil remained at similar levels in both treatment and control groups. This suggests that treated water flushed out sodium and chloride. Zinc and manganese concentrations were again higher in plants irrigated with treated water. Visual observation of plants showed rapid leaf color changes where they beame more visibly green and saturated. Manganese is the microelement responsible for photosynthesis and along with zinc has a direct impact on leaf color and saturation.

CONCLUSION

The following important conclusions can be drawn from these experiments:
1. Plants irrigated with treated water showed increased growth rates among all three different types of plant species (lettuce, squash and orange).
2. Experiments conducted with lettuce grown in four different soils showed that basic yield parameters were higher in three of four soils (silty loam, sandy clay and silty clay) irrigated by treated water. Lettuce's yield in sandy loam was essentially unchanged from control group to treatment group.
3. Changes in the physical and chemical properties of treated water allowed plants to more effectively uptake water. Up to 50% reductions in the volume of water used in irrigation are supported when water is treated first.
4. Plants irrigated with treated water more effectively took up important plant nutrients, especially zinc, one of the most important nutrients. Moreover, a chemical analysis of plant leaves irrigated with 50% and 75% of total treated water released higher concentrations of other microelements such as manganese and iron.
5. Despite the low concentration of nutrients in soil, plants irrigated by treated water did not show any deficit of macro or microelements thereby showing that plants irrigated with treated water had increased efficiency of nutrient uptake.
6. Experiments conducted with three different levels of salinity from different well sources (1.9, 1.6 and 3.8 mS/cm) showed that treated water reduced the normally harmful effects of water salinity.

Hard Water Experiment

The formation of calcium carbonate is a common ionic reaction that takes place in natural environments and creates a problem known as scaling, which is present in our everyday life and in various industrial processes and technologies. Despite the simplicity of the reaction there is considerable variability in the properties of the solid product, such as: crystal form, particle size distribution, electro-kinetic potential, etc. One of the most important applications of WWTS treated water is scale prevention and elimination.

Although the exact mechanics of the interaction between magnetic treatments and calcium carbonate in solution is still unknown the following hypothesis is most probable. In solution, high concentrations of calcium carbonate tend to precipitate out of solution in the form of calcium carbonate crystals (calcite). Crystal formation normally occurs via a "seeding" effect on the surfaces of naturally-occurring, foreign carbonate particles. Crystal formation in water with high concentrations of calcium carbonate tends to occur on hard surfaces such as tile, plaster, metal and plastic. Magnetically treated water directly affects the equilibrium of carbonate in water and breaks up the large, water molecule/carbonate complexes. Thus, after treatment, calcium carbonate precipitates on particles in solution, not on hard surfaces, and is removed by filtration.

In addition to inhibiting precipitation on hard surfaces, magnetic treatment also breaks down and removes previously deposited crystal formations. As magnetically treated water has a lower surface density, it tends to weaken the bond between the wall and the calcium carbonate so that deposits break off in large pieces from walls and other surfaces. The dissolving process may take several days or even weeks. Detached crystals can be caught by filtration and/or slowly dissolved in magnetized water producing a higher water calcium concentration and a more alkaline pH level.

The experimental was conducted in two similar, water-circulating units, one containing treated water, the other without treated water. Submersible pumps were installed on the bottom of two water tanks (20 gal). Recirculation loops were made from PVC pipes. Seven gallons of municipal were added to each tank and pumped through at a flow rate 3 gpm. A five-micron filter was installed in the loop of both systems to measure calcium carbonate scale levels in each unit at the end of the experiment. Muriatic acid and chlorinating solution were added to the tanks every day to keep pH within a range 7.0-7.5 and chlorine concentrations between 0.8-1.5 ppm (average ranges for most swimming pools and water features). Water was recirculated continuously for 500 Hours. Water samples were taken every day to check EC, pH and chlorine concentrations. Concentrations of anions and cations were checked at the beginning and end of the experiment. Five different pieces of older swimming pool surfaces with differing areas, sizes, surfaces and scale concentrations were placed on the bottom of each tank: 1) glazed tile; 2) green plaster, 3) white plaster, 4) blue plaster and; 5) pebble (Table 26).

TABLE 26

| Type of surface | Control Area, $cm^2$ | WWTS Area, $cm^2$ | Amount | Surface | Color |
|---|---|---|---|---|---|
| Glazed Tile | 16.0 | 16.0 | 2 | Smooth | Blue |
| Plaster I | 34.0 | 21.5 | 1 | Porous | Green |
| Plaster II | 40.0 | 42.0 | 1 | Porous | White |
| Plaster III | 28.0 | 30.0 | 1 | Porous | Blue |
| Pebble Finishes | 46.0 | 60.0 | 1 | Smooth | Black |

Visual inspection of the pieces was conducted before and after the experiment. The following was observed:
1. The surface of Plaster III was a blue-greenish color prior to treatment. After treatment, it became blue in treated water, control was unchanged.
2. The surface of Plaster II became whiter in the treatment unit.
3. Glazed Tiles became more bluish and clean.
4. Green plaster was unchanged.
5. Black pebble became brighter and cleaner.

Generally speaking, visual observation supported the hypothesis that treated water reduced scale formation and removed existing crystal deposits Water chemical parameters were measured before and after the experiment. Concentrations of calcium were 42% higher in the treatment group, compared to control supporting the hypothesis that calcium carbonate scaling on surfaces was inhibited and prior surface deposits were dissolved. To determine the comparative levels of calcium concentration on the surfaces of both the treatment and control pieces, small sections of each (16 $cm^2$) were cleaned by 1 ml of HCl (1:1) and then diluted to 50 ml by distilled water. Calcium concentrations in the distilled water solution was determined by ionic chromatography (Table 27).

TABLE 27

| Type of surface | Ca on the surface, ug/cm² | | Calcium Reduction, times | Water | | | |
|---|---|---|---|---|---|---|---|
| | Control | WWTS | | Parameter | Initial | Control | WWTS |
| Glazed Tile | 318.1 | 104.1 | 3.0 | EC, mS/cm | 1.08 | 1.59 | 1.64 |
| Plaster I | 1746.6 | 973.4 | 1.8 | pH | 8.16 | 7.53 | 7.46 |
| Plaster II | 3157.8 | 2295.9 | 1.4 | Ca, ppm | 77.9 | 90.6 | 128.6 |
| Plaster III | 785.5 | 720.6 | 1.1 | Mg, ppm | 26.5 | 23.9 | 16.2 |
| Pebble Finishes | 1781.9 | 995.6 | 1.8 | Cl, ppm | 90.6 | 335.4 | 331.3 |

Calcium levels on all surfaces from the treatment group were significantly lower than the control group. Reductions ranged from 10% to 300% with the largest reductions occurring on the least porous surfaces.

The five-micron filter was placed in an ultrasonic bath (in 1 L of distilled water) for 20 minutes to remove solid particles from the surface. Most removed particles were organic in nature and no calcium carbonate crystals were found on the surface or in the water. The filter used in the treatment group had a greater concentration of calcium compared to the control group (14.1 mg and 12.0 mg, respectively).

The data demonstrated that treated water is a stronger solvent than untreated water. The reduction of calcium concentrations on the various surfaces and the simultaneous increase of calcium concentrations in the water of the treatment unit demonstrated that treated water inhibits the precipitation of scale deposits on hard surfaces and removes previously deposited crystal formations. The rate of removal of prior deposits was dependent on the porosity of the surface.

An embodiment of the present invention provides a device directed to: 1) in-line installation within the plumbing of landscape and agricultural irrigation systems, residential, whole-house systems and pools, fountains and other decorative water feature systems and; 2) attachment to faucets and garden hoses for additional residential uses.

One embodiment of the present invention provides a water treatment device for the in-line treatment of water, the water treatment device comprised of:
   a housing;
   at least a first flange unit and a second flange unit;
   at least a large screen;
   at least a small screen; and
   a active-ceramic bead media.

In a preferred embodiment, the housing is make from a durable plastic material.

In a further preferred embodiment, the flange units, the screens and the active-ceramic beads are enclosed in a separate, removable "active cell" unit which itself fits into the housing. A proprietary tool is required to remove the active cell for maintenance or replacement.

In another embodiment of the present invention, the housing is further comprised of:
   an upper housing;
   a lower housing;
   and a coupler disposed between the upper housing and the lower housing.

In yet another embodiment of the present invention, the upper housing and the lower housing are further comprised of chambers. In a preferred embodiment, the chambers of the upper housing are configured to contain various elements of the water treatment device, including the first and second flange units. In another preferred embodiment, the chambers of the lower housing are configured to contain the larger screen, the smaller screen and the active-ceramic bead media, the active-ceramic bead media disposed in a chamber located between the larger screen and the smaller screen.

In still another embodiment of the present invention, the first flange and the second flange are further comprised of a plurality of openings and baffles, the openings configured to receive "donut-style" rare-earth magnets in a precise design and the baffles configured to allow for the flow of water through the first flange and the second flange. In a preferred embodiment, the magnet placement within the first flange is in opposition to the magnet placement within the second flange. In a more preferred embodiment, the flanges may contain a plurality of openings, each opening receiving a rare-earth magnet. The flanges are typically created from ½ inch thick, clear polycarbonate plastic. Although other suitable materials may be utilized, i.e. epoxy resin, polycarbonate plastic is the preferred material due to its ability to withstand the forces created within the water treatment system.

In yet a further embodiment of the present invention, the active-ceramic bead media may be comprised from any appropriate ceramic filtration media from an FDA approved, commercial supplier. In a preferred embodiment, the ceramic bead media may be comprised from an optimized mixture of beads capable of exerting the desired improvements on the water passing through the water treatment system. In a further preferred embodiment, the optimized mixture may be determined by experimental results from test treatments of local water profiles. In a most preferred embodiment, the optimized media may be chosen based on the end use of the water to be treated, i.e. irrigation, household or agriculture.

In another embodiment the present invention, the water treatment device may treat water originating from natural sources such as wells, streams and rivers as well as municipal water prior to end use.

In a further embodiment of the present invention, the water treatment device may customized for treatment of the water profile in the geographical area of installation.

In still another embodiment of the present invention, the water treatment device alters the characteristics of water passing through the system by altering both the physical and chemical properties of the treated water.

Another embodiment of the present invention provides a water treatment device which utilizes at least four treatment modalities: 1) rare-earth magnets configured in a unique arrangement; 2) active-ceramic beads; 3) vortex generators and; 4) design features which create a low pressure/flow rate and high water-volume environment, in a single system.

In a further still embodiment of the present invention, the water treatment device may be custom configured to achieve desirable pH ranges.

Another embodiment of the present invention provides a water treatment device that when used with appropriate filtration technology, is designed to remove harmful contaminants and enhance beneficial minerals.

Yet another embodiment of the present invention provides a water treatment device that improves the ability of plants to uptake water resulting in reduced use of water in irrigation and agricultural applications.

Still another embodiment of the present invention provides a water treatment device that improves the ability of plants to uptake beneficial nutrients resulting in reduced use of fertilizer in irrigation and agricultural applications.

Yet another embodiment of the present invention provides a water treatment device that dissolves and flushes away harmful salts resulting in improved agricultural production.

Another embodiment of the present invention provides a water treatment device that improves the permeability of water through soil, membranes and biological systems.

Still another embodiment of the present invention provides a water treatment device that demonstrates its greatest effect on the poorest quality soil and water.

Yet another embodiment of the present invention provides a water treatment device that reduces the rate of hard water scale formation in systems handling water with high calcium carbonate concentrations.

Another embodiment of the present invention provides a water treatment device that dissolves previously deposited hard water scale formations in systems handling water with high calcium carbonate concentrations.

A further embodiment of the present invention provides An apparatus for filtering water comprising at least two halves separated by at least one coupler, comprising:

(a) a first half comprising a first screen and a second screen, wherein an array of ceramic beads rests in between the first screen and the second screen;

(b) a second half further comprising at least one layer comprising at least one membrane further comprising an arrangement of magnets set within the membrane, wherein the arrangement of magnets is interspersed with a series of water flow passages allowing for the passage of water from one side of the at least one layer to the other side of the at least one layer.

It will be appreciated that details of the foregoing embodiments, given for purposes of illustration, are not to be construed as limiting the scope of the invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is further defined in the converted utility application and appended claims. Further, it is recognized that many embodiments may be conceived that do not achieve all the advantages of some embodiments, particularly preferred embodiments, yet the absence of a particular advantage shall not be construed to necessarily mean that such an embodiment is outside the scope of the present invention.

The invention claimed is:

1. A water treatment device for the in-line treatment of water, the water treatment device comprised of:
   a housing;
   a first flange unit and a second flange unit, wherein the first flange unit and the second flange unit are further comprised of a plurality of openings and baffles, the openings configured to receive rare-earth magnets;
   a large screen;
   a small screen; and
   an active-ceramic bead media.

2. The water treatment device of claim 1 wherein the housing is made from a durable plastic material.

3. The water treatment device of claim 1 wherein the housing is further comprised of:
   an upper housing;
   a lower housing; and
   a coupler disposed between the upper housing and the lower housing.

4. The water treatment device of claim 3 wherein the upper housing is further comprised of chambers containing the first flange unit and the second flange unit.

5. The water treatment device of claim 3 wherein the lower housing contains the large screen and the small screen wherein the active-ceramic bead media is disposed in a chamber located between the large screen and the small screen.

6. The water treatment device of claim 1 wherein the rare-earth magnets are donut shaped to allow the flow of water through the first flange and the second flange.

7. The water treatment device of claim 6 wherein the water treatment device effectively treats water originating from a natural source, the natural source select from the group consisting of wells, streams and rivers.

8. The water treatment device of claim 6 wherein the water treatment device effectively treats water origination from a municipal water facility.

9. The water treatment device of claim 6 wherein the water treatment device may be customized for treatment of the water profile in the geographical area of installation.

10. The water treatment device of claim 6 wherein the water treatment device alters the characteristics of water passing through the device by altering the physical and chemical properties of the treated water.

11. The water treatment device of claim 6 wherein the water treatment device may be custom configured to achieve desired pH ranges in treated water.

12. The water treatment device of claim 6 wherein the water treatment device is designed for use in conjunction with existing filtration technology thereby removing harmful contaminants from and enhancing beneficial nutrients in treated water.

* * * * *